US008023794B2

(12) United States Patent
Morris et al.

(10) Patent No.: US 8,023,794 B2
(45) Date of Patent: Sep. 20, 2011

(54) APPARATUS AND METHOD FOR ESTABLISHING AN OPTICAL PATH SPANNING A DISCONTINUITY IN AN OPTICAL CHANNEL

(75) Inventors: Charles Eugene Morris, Saint Louis, MO (US); Thomas L. Weaver, Webster Groves, MO (US); Kirby J. Keller, Chesterfield, MO (US)

(73) Assignee: The Boeing Company, Chicago, IL (US)

( * ) Notice: Subject to any disclaimer, the term of this patent is extended or adjusted under 35 U.S.C. 154(b) by 61 days.

(21) Appl. No.: 12/538,579

(22) Filed: Aug. 10, 2009

(65) Prior Publication Data

US 2011/0033153 A1 Feb. 10, 2011

(51) Int. Cl.
*G02B 6/00* (2006.01)
*G02B 6/38* (2006.01)

(52) U.S. Cl. .............. 385/137; 385/25; 385/26; 385/56; 385/62; 385/66; 385/99

(58) Field of Classification Search .................... 385/25, 385/26, 56, 62, 66, 99, 137
See application file for complete search history.

(56) References Cited

U.S. PATENT DOCUMENTS

| 4,279,467 | A | | 7/1981 | Borsuk et al. | |
|---|---|---|---|---|---|
| 4,281,892 | A | | 8/1981 | Sitabkhan | |
| 4,358,634 | A | * | 11/1982 | Dienes | 174/88 R |
| 4,538,021 | A | * | 8/1985 | Williamson, Jr. | 174/92 |
| 5,113,463 | A | | 5/1992 | Nodari | |
| 5,288,947 | A | * | 2/1994 | Stewing | 174/92 |
| 5,397,859 | A | * | 3/1995 | Robertson et al. | 174/92 |
| 5,835,658 | A | * | 11/1998 | Smith | 385/136 |
| 5,844,171 | A | * | 12/1998 | Fitzgerald | 174/92 |
| 6,265,880 | B1 | | 7/2001 | Born et al. | |
| 6,387,621 | B1 | | 5/2002 | Wittwer | |
| 6,587,621 | B2 | | 7/2003 | Weaver | |
| 2006/0204198 | A1 | * | 9/2006 | Michiels | 385/135 |
| 2007/0104446 | A1 | * | 5/2007 | Lu et al. | 385/135 |
| 2010/0092147 | A1 | * | 4/2010 | Desard et al. | 385/135 |

OTHER PUBLICATIONS

Wiggins Clamps; www.Burnsstainless.com; Jun. 22, 2009.
MT Ferrules & MTP Multifiber Single-mode & Multimode Connectors; product description www.usconec.com; Rev. 5—Jan. 2007.

* cited by examiner

*Primary Examiner* — Ryan Lepisto
(74) *Attorney, Agent, or Firm* — Law Office of Donald D. Mondul

(57) ABSTRACT

An apparatus for establishing an optical circuit path spanning a discontinuity in an optical channel supported by a first cable oriented about a first axis on a first side of the discontinuity and supported by a second cable section oriented about a second axis on a second side of the discontinuity includes: (a) a first coupling member coupled with the optical channel on the first side; (b) a first supporting member fixed with the first coupling member in an installed orientation in a clamping relation with the first cable section; (c) a second coupling member coupled with the optical channel on the second side; (d) a second supporting member fixed with the second coupling member in an installed orientation clamped with the second cable section; and (e) a connecting member optically coupling the first coupling member with the second coupling member to establish the optical circuit path.

16 Claims, 4 Drawing Sheets

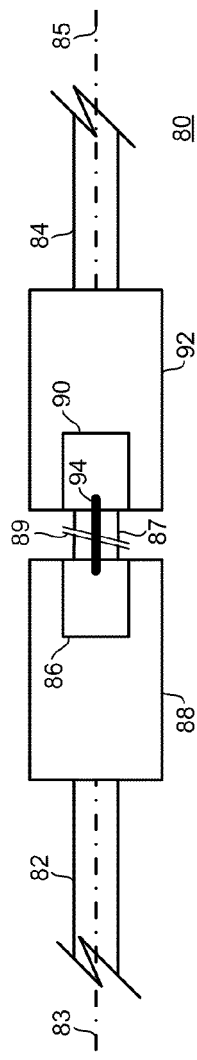
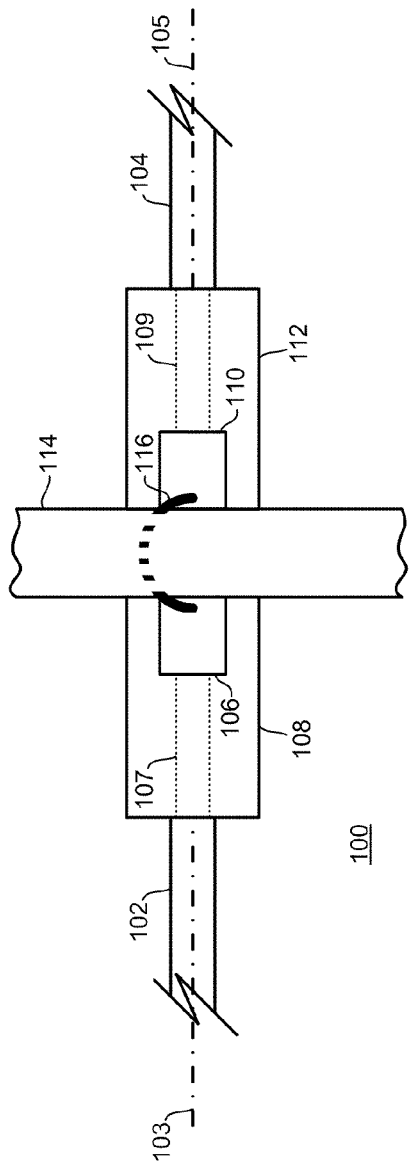
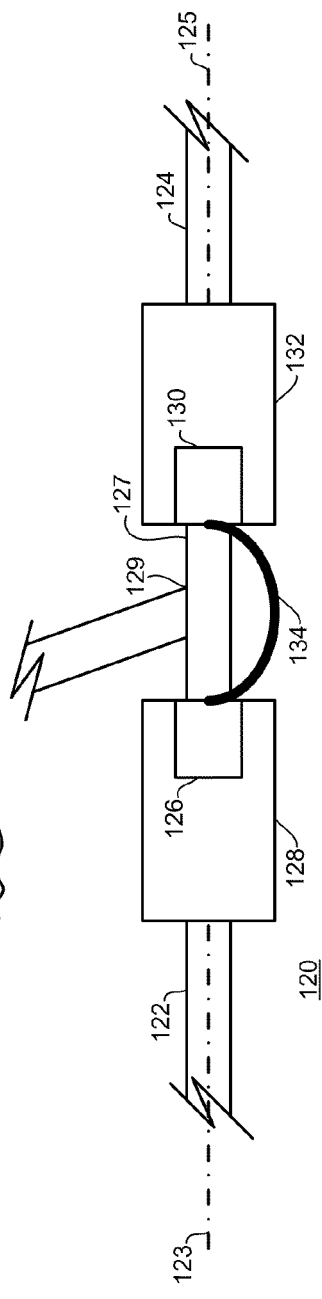
FIG. 3
FIG. 4
FIG. 5

APPARATUS AND METHOD FOR ESTABLISHING AN OPTICAL PATH SPANNING A DISCONTINUITY IN AN OPTICAL CHANNEL

TECHNICAL FIELD

The present disclosure is directed to fiber optic channels, and especially to interconnection of fiber optic channels.

BACKGROUND

Fiber optical systems may be employed in, by way of example and not by way of limitation, data communications, communication or sensor systems with vehicle health management computers or other applications. There may be situations, equipment locations or other reasons that may make it impractical to route fiber optic channels thru existing installed wire bundles or cable members or sections in an installed system. Installed systems may be located, by way of example and not by way of limitation, in an aircraft or another vehicle.

Existing solutions for adding an optical fiber system element to an existing wire bundle may require the use of relatively large and separate optical connectors. The extra connectors may require a new bracket to be installed to which the connector may be mounted, or may require an additional clamp to secure the extra connector to an installation structure. Further, such existing solutions may not provide a simple way of utilizing existing wire bundle routings (e.g., cable members or sections) to provide continuation of a fiber optic channel through structures such as bulkheads and may not facilitate repair of fiber when original fiber may be damaged such as, by way of example and not by way of limitation, from chafing, from repair efforts or from inadvertent damage during maintenance or operation. Such existing solutions may make access to fiber optic connections more difficult to access for testing. Such existing solutions may not permit maintaining fiber optic connectivity where a wire bundle may be sliced into for effecting electrical access.

There is a need for an apparatus and method for establishing an optical path spanning a discontinuity in an optical channel that may be employed without requiring large optical connectors or additional brackets.

There is a need for an apparatus and method for establishing an optical path spanning a discontinuity in an optical channel that may be employed to provide continuation of a fiber optic channel thru structures such as bulkheads.

SUMMARY

An apparatus for establishing an optical circuit path spanning a discontinuity in an optical channel supported by a first cable oriented about a first axis on a first side of the discontinuity and supported by a second cable section oriented about a second axis on a second side of the discontinuity includes: (a) a first coupling member coupled with the optical channel on the first side; (b) a first supporting member fixed with the first coupling member in an installed orientation in a clamping relation with the first cable section; (c) a second coupling member coupled with the optical channel on the second side; (d) a second supporting member fixed with the second coupling member in an installed orientation clamped with the second cable section; and (e) a connecting member optically coupling the first coupling member with the second coupling member to establish the optical circuit path.

A method for establishing an optical circuit path spanning a discontinuity in at least one optical channel supported by a first cable section generally oriented about a first axis on a first side of the discontinuity and supported by a second cable section generally oriented about a second axis on a second side of the discontinuity; includes: (a) providing a first coupling member coupled with the at least one optical channel on the first side of the discontinuity; (b) providing a first supporting member substantially fixedly situated with the first coupling member; the first supporting member being substantially fixedly situated in an installed orientation in a generally clamping relation with the first cable section; (c) providing a second coupling member coupled with the at least one optical channel on the second side of the discontinuity; (d) providing a second supporting member substantially fixedly situated with the second coupling member; the second supporting member being substantially fixedly situated in an installed orientation in a generally clamping relation with the second cable section; (e) providing a connecting member; and (f) installing the connecting member to effect optically coupling the first coupling member with the second coupling member to establish the optical circuit path.

It is, therefore, a feature of the present disclosure to provide an apparatus and method for establishing an optical path spanning a discontinuity in an optical channel that may be employed without requiring large optical connectors or additional brackets.

It is a further feature of the present disclosure to provide an apparatus and method for establishing an optical path spanning a discontinuity in an optical channel that may be employed to provide continuation of a fiber optic channel thru structures such as bulkheads.

Further features of the present disclosure will be apparent from the following specification and claims when considered in connection with the accompanying drawings, in which like elements are labeled using like reference numerals in the various figures, illustrating embodiments of the disclosure.

BRIEF DESCRIPTION OF THE DRAWINGS

FIG. 3 is a plan view of the apparatus of the disclosure employed to establish a fiber optic jumper configuration.

FIG. 4 is a plan view of the apparatus of the disclosure employed to establish a fiber optic jumper configuration through a structural member.

FIG. 5 is a plan view of the apparatus of the disclosure employed to establish a fiber optic jumper configuration around a branch circuit or around a splice.

DETAILED DESCRIPTION

Figure 1:
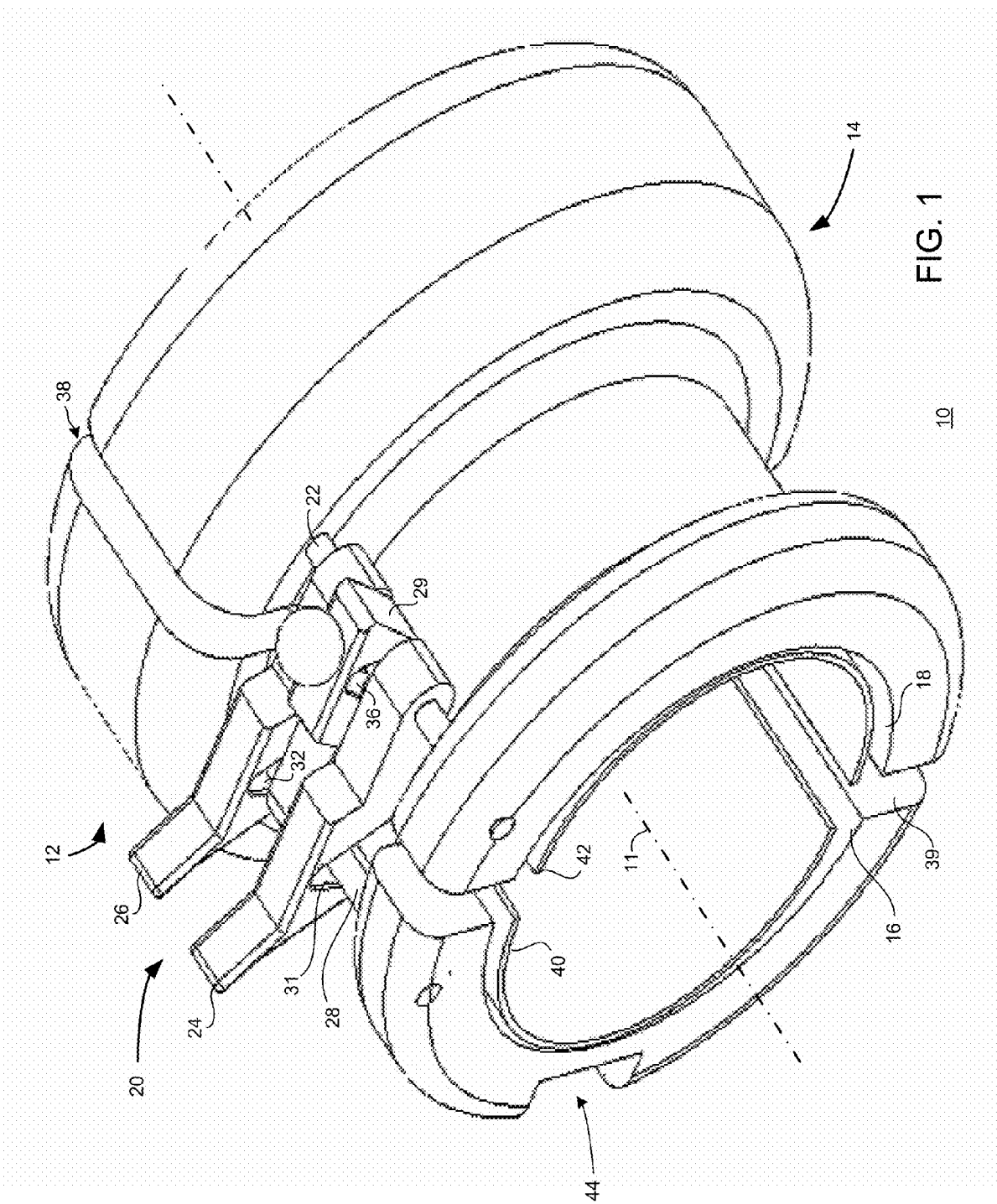
FIG. 1 is a perspective schematic illustration of a representative supporting member for use with the disclosure.

FIG. 1 is a perspective schematic illustration of a representative supporting member for use with the disclosure. In FIG. 1, a supporting member 10 may be substantially symmetrically oriented about an axis 11 (when installed) and may be configured in a split-ring structure having a first split-ring portion 12 and a second split-ring portion 14. Split-ring portion 12 may present a semi-cylindrical inner surface 16. Split-ring portion 14 may present a semi-cylindrical inner surface 18. Split-ring portions 12, 14 may be hingingly coupled (not shown in FIG. 1; see FIG. 2) at a first locus of split-ring portions 12, 14. Split-ring portions 12, 14 may be latchingly coupled together by a latching mechanism 20 at a second locus of split-ring portions 12, 14 substantially 180 degrees removed from the first locus.

Latching mechanism 20 may include a support bar 22, a support bar 28 and latches 24, 26, 29. Latches 24, 26 may be rotatingly mounted on support bar 22 in a manner permitting rotational movement of latches 24, 26 about support bar 22 toward and away from support bar 28. Latches 24, 26 may be configured with notch structures 31, 32. Notch structures 31, 32 may be configured to be sufficiently flexible so that latches 24, 26 may be urged against support bar 28 to flex notch structures 31, 32 to pass over support bar 28 and latchingly engage support bar 28 to orient latching mechanism 20 in an installed orientation. Latch 29 may be rotatingly mounted on support bar 28 in a manner permitting rotational movement of latch 29 about support bar 28 toward and away from support bar 22. Latch 29 may be configured with a notch structure 36. Notch structure 36 may be configured to be sufficiently flexible so that latch 29 may be urged against support bar 28 to flex notch structure 36 to pass over support bar 22 and latchingly engage support bar 22 to orient latching mechanism 20 in the installed orientation.

Supporting member 10 is illustrated in FIG. 1 in an exploded orientation with gaps 38, 39 between split-ring portions 12, 14. In the installed orientation, split-ring portions 12, 14 may be in substantially facing relation encircling and clampingly engaging or capturing a cable member or cable section (see FIG. 2). In the installed orientation, semi-cylindrical inner surface 16 and semi-cylindrical inner surface 18 may cooperate to present a substantially cylindrical inner surface engaging a cable member or cable section (see FIG. 2). A semi-cylindrical inner liner 40 may be interposed between semi-cylindrical inner surface 16 and a clampingly engaged cable member or cable section in the installed orientation. A semi-cylindrical inner liner 42 may be interposed between semi-cylindrical inner surface 18 and a clampingly engaged cable member or cable section in the installed orientation. Semi-cylindrical inner liners 40, 42 may preferably be configured with low friction material such as, by way of example and not by way of limitation, Teflon® (Teflon® is a registered trademark of E.I. du Pont de Nemours and Company) facing the cable member or cable section in the installed orientation. A low friction material may allow clamp halves to slide easily on a cable member or cable section during a clamping process. Semi-cylindrical inner liners 40, 42 may be configured to include a compliant material on the sides facing away from the cable member or cable section in the installed orientation, or on the side facing the cable member or cable section. A soft and compliant layer (which may also be low friction) facing a cable member or cable section may allow a clamp to deform somewhat so as to distribute clamping pressure on a cable member or cable section during a clamping process.

Supporting member 10 may present a receiving structure 44 in one (or both) of split-ring portions 12, 14. Receiving structure 44 may be configured to substantially fixedly receive a coupling member that may be coupled with at least one optical channel in a cable member or cable section (see FIG. 2).

Figure 2:
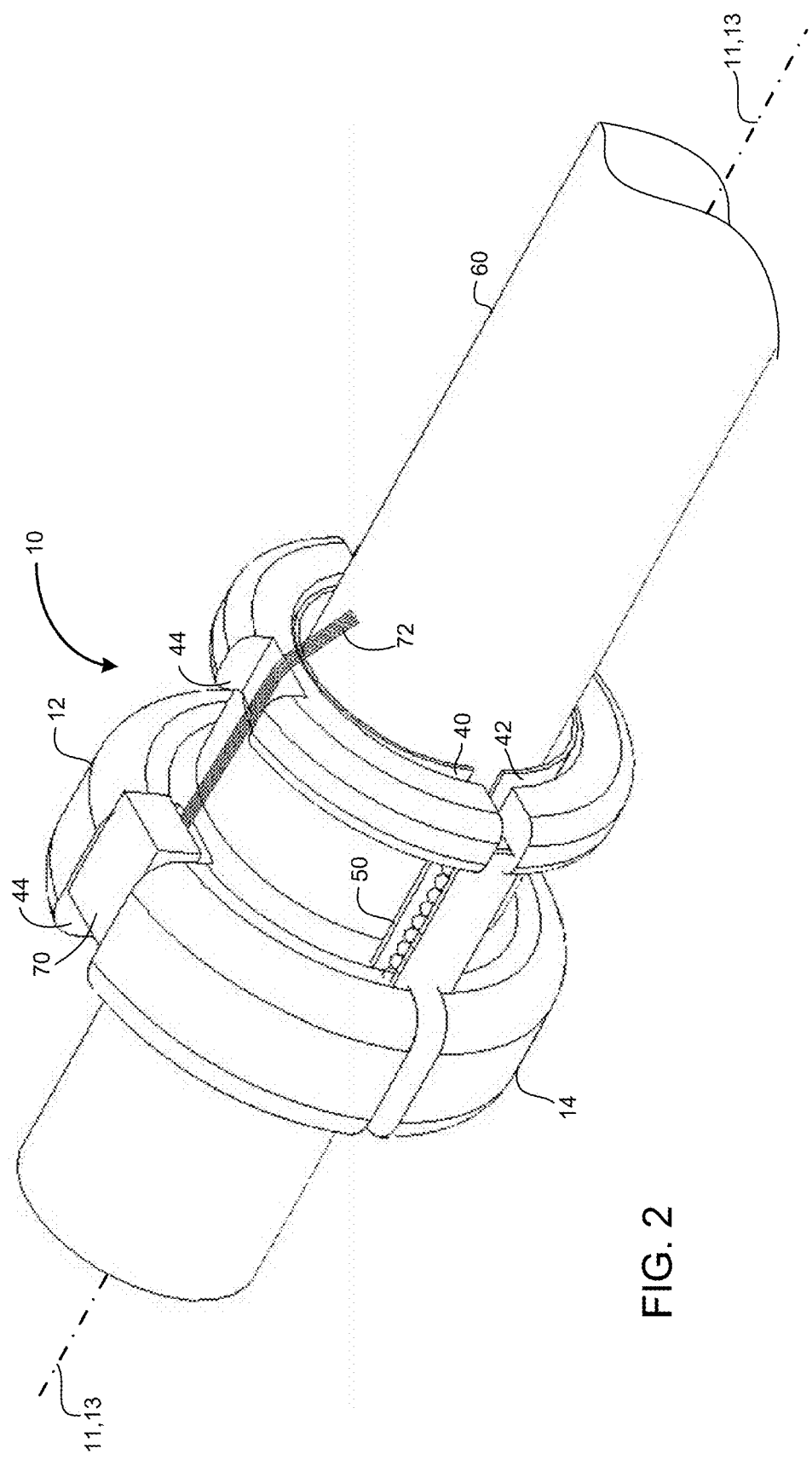
FIG. 2 is a perspective schematic illustration of the apparatus of the disclosure poised for installation with a cable section.

FIG. 2 is a perspective schematic illustration of the apparatus of the disclosure poised for installation with a cable section. In FIG. 2, a supporting member 10 configured substantially as described in connection with FIG. 1 is poised in an encircling relation about a cable member or section 60. In FIG. 2, latching mechanism 20 is not visible (see FIG. 1). In FIG. 2, a hinge member 50 is visible connecting split-ring portions 12, 14. In FIG. 2, supporting member 10 may be in spaced relation with respect to cable member or section 60. Support member 10 may be substantially symmetrical with respect to axis 11 (when installed). Cable member or section 60 may be substantially symmetrical with respect to an axis 13. When supporting member 10 may be in an installed relation with cable member or section 60, axis 11 may be substantially coaxial with axis 13. Closing latching member 20 by urging latches 24, 26, 29 into engagement with support bars 22, 28 (as described above in connection with FIG. 1) may close the space between cable member or section 60 and supporting member 10 so that supporting member 10 may encircle cable member or section 60 in a clamping relation to substantially fix supporting member 10 with respect to cable member or section 60.

A coupling member 70 may be substantially fixedly situated within receiving structure 44. Coupling member 70 may present an optical lead 72. Optical lead 72 may be coupled with an optical channel associated with cable member or section 60. Details of connection of optical lead 70 with an optical channel are not illustrated in FIG. 2; such details are known to those skilled in the art of optical circuit design and such details are not within the scope of this disclosure. An optical channel appropriate for connection with optical lead 72 may include, by way of example and not by way of limitation, one or more optical fibers in an optical fiber bundle, an optical path established on the outer surface of cable member or section 60 to detect chafing of cable member or section 60 or another optical channel. Coupling member 70 may present a coupling structure (not shown in detail in FIG. 2) to facilitate optical coupling with coupling member 70 from elsewhere such as, by way of example and not by way of limitation, an optical connecting member for establishing an optical circuit path (see FIGS. 3-5). Such coupling structures are known to those skilled n the art of optical circuit design. By way of example and not by way of limitation, coupling member 70 may be embodied in an MT (Mechanical Transfer) ferrule of the sort manufactured and sold by US Conec, Ltd. of Hickory, N.C. (www.usconec.com). Coupling member 70, rather than optically connecting optical channel 72 to another optical channel to complete an optical circuit, may instead contain or connect to optoelectronic devices such that coupling member 70 connects an electrical path to an optical path and converts signals from one format to another appropriately for traversing an electrical path or an optical path.

Supporting member 10 may be embodied in configuration similar to a Wiggins™ split-ring type connector known by those skilled in the art of fuel line installation and similar technologies and sold, for example, by Burns Stainless, LLC. (www.burnsstainless.com). When installing a Wiggins connector one first may install weld ferrules to the two tubes to be connected and O-rings may be installed on the weld ferrules. Then an O-ring sleeve may be placed over the weld ferrules and a clamshell clamp may be snapped into place over the O-ring sleeve to provide a flexible sealed connection of the two tubes. The split-ring supporting member of the present disclosure is not employed to provide a flexible sealed connection of two tubes and does not employ all of the components—weld ferrules for two tubes, O-rings for two tubes and an O-ring sleeve—that may be required in employing a Wiggins clamp in a sealed tube application, such as a fuel line or similar arrangement. In contrast, the split-ring support member of the present disclosure may provide an anchor for an optical connection member employed to establish an optical circuit path spanning a discontinuity in at least one optical channel. The disclosure may provide connectivity solutions that may be impractical or impossible using current conventional connector methods because of the size, weight, cost, location or other aspects of existing solutions.

FIG. 3 is a plan view of the apparatus of the disclosure employed to establish a fiber optic jumper configuration. In FIG. 3, an apparatus 80 may be installed with a first cable section 82 generally oriented about an axis 83 and a second cable section 84 generally oriented about an axis 85. Axes 83, 85 may be coaxial. First cable section 82 and second cable section 84 may cooperate to establish at least one optical channel 87. The at least one optical channel 87 may experience a discontinuity 89. It may be desired to establish a jumper-style bypass optical circuit around discontinuity 89. Apparatus 80 may include a first coupling member 86 coupled with at least one optical channel in first cable section 82 (not shown in FIG. 3; see FIG. 2) and a first supporting member 88 substantially fixedly situated with first coupling member 86 and substantially fixedly clamped with first cable section 82.

Apparatus 80 may further include a second coupling member 90 coupled with at least one optical channel in second cable section 84 (not shown in FIG. 3; see FIG. 2) and a second supporting member 92 substantially fixedly situated with second coupling member 90 and substantially fixedly clamped with second cable section 84.

Apparatus 80 may further include a connecting member 94. Connecting member 94 may optically couple first coupling member 86 with second coupling member 90 to establish the desired jumper-style bypass optical circuit around discontinuity 89.

Apparatus 80 could also be used to connect at least one optical channel of one cable to at least one optical channel of another cable to which the first cable has no other physical or electrical connection. Furthermore, apparatus 80 could be used to connect at least one optical channel of one cable to another optical device that is not associated with any cable at all.

FIG. 4 is a plan view of the apparatus of the disclosure employed to establish a fiber optic jumper configuration through a structural member. In FIG. 4, an apparatus 100 may be installed with a first cable section 102 generally oriented about an axis 103 and a second cable section 104 generally oriented about an axis 105. Axes 103, 105 may be coaxial. First cable section 102 may establish at least one first optical channel 107. Second cable section 104 may establish at least one second optical channel 109. Optical channels 107, 109 may be prevented from joining into a single optical channel by an obstruction or discontinuity embodied in a structural element such as, by way of example and not by way of limitation, a bulkhead 114. It may be desired to establish an optical circuit path through bulkhead 1 14. Apparatus 100 may include a first coupling member 106 coupled with at least one optical channel in first cable section 102 (not shown in FIG. 4; see FIG. 2) and a first supporting member 108 substantially fixedly situated with first coupling member 106 and substantially fixedly clamped with first cable section 102.

Apparatus 100 may further include a second coupling member 110 coupled with at least one optical channel in second cable section 104 (not shown in FIG. 4; see FIG. 2) and a second supporting member 112 substantially fixedly situated with second coupling member 110 and substantially fixedly clamped with second cable section 104.

Apparatus 80 may further include a connecting member 116. Connecting member 116 may optically couple first coupling member 106 with second coupling member 110 to establish the desired optical circuit path through an aperture (not shown in detail in FIG. 4) in bulkhead 1 14. Connecting member 116 may be embodied in a generally flexible length of optically transmitting material. Such generally flexible optically transmitting material may be installed to traverse bulkhead 114 using a significantly smaller aperture than may be required using existing techniques for establishing an optical circuit through an obstruction such as a bulkhead. Further, supporting members 106, 110 may be situated substantially adjacent to bulkhead 114 (or another obstruction) to provide support for connecting member 116 near where connecting member 116 traverses the obstruction.

Apparatus 100 could also be used to connect at least one optical channel of one cable through an obstruction to at least one optical channel of another cable to which the first cable has no other physical or electrical connection. Furthermore, apparatus 100 could be used to connect at least one optical channel of one cable through an obstruction to another optical device that is not associated with any cable at all.

FIG. 5 is a plan view of the apparatus of the disclosure employed to establish a fiber optic jumper configuration around a branch circuit or around a splice. In FIG. 5, an apparatus 120 may be installed with a first cable section 122 generally oriented about an axis 123 and a second cable section 124 generally oriented about an axis 125. Axes 123, 125 may be coaxial. First cable section 122 and second cable section 124 may cooperate to establish at least one optical channel 127. The at least one optical channel 127 may include a branch circuit or a splice 129. It may be desired to establish a jumper-style bypass optical circuit around branch circuit or splice 129. Apparatus 120 may include a first coupling member 126 coupled with at least one optical channel in first cable section 122 (not shown in FIG. 5; see FIG. 2) and a first supporting member 128 substantially fixedly situated with first coupling member 126 and substantially fixedly clamped with first cable section 122.

Apparatus 120 may further include a second coupling member 130 coupled with at least one optical channel in second cable section 124 (not shown in FIG. 5; see FIG. 2) and a second supporting member 132 substantially fixedly situated with second coupling member 130 and substantially fixedly clamped with second cable section 124.

Apparatus 120 may further include a connecting member 134. Connecting member 134 may optically couple first coupling member 126 with second coupling member 130 to establish the desired jumper-style bypass optical circuit around branch circuit or splice 129.

Apparatus 120 could also be used to connect at least one optical channel of one cable from the region of a branch or splice to at least one optical channel of another cable to which the first cable has no other physical or electrical connection. Furthermore, apparatus 120 could be used to connect at least one optical channel of one cable from the region of a branch or splice to another optical device that is not associated with any cable at all.

Figure 6:
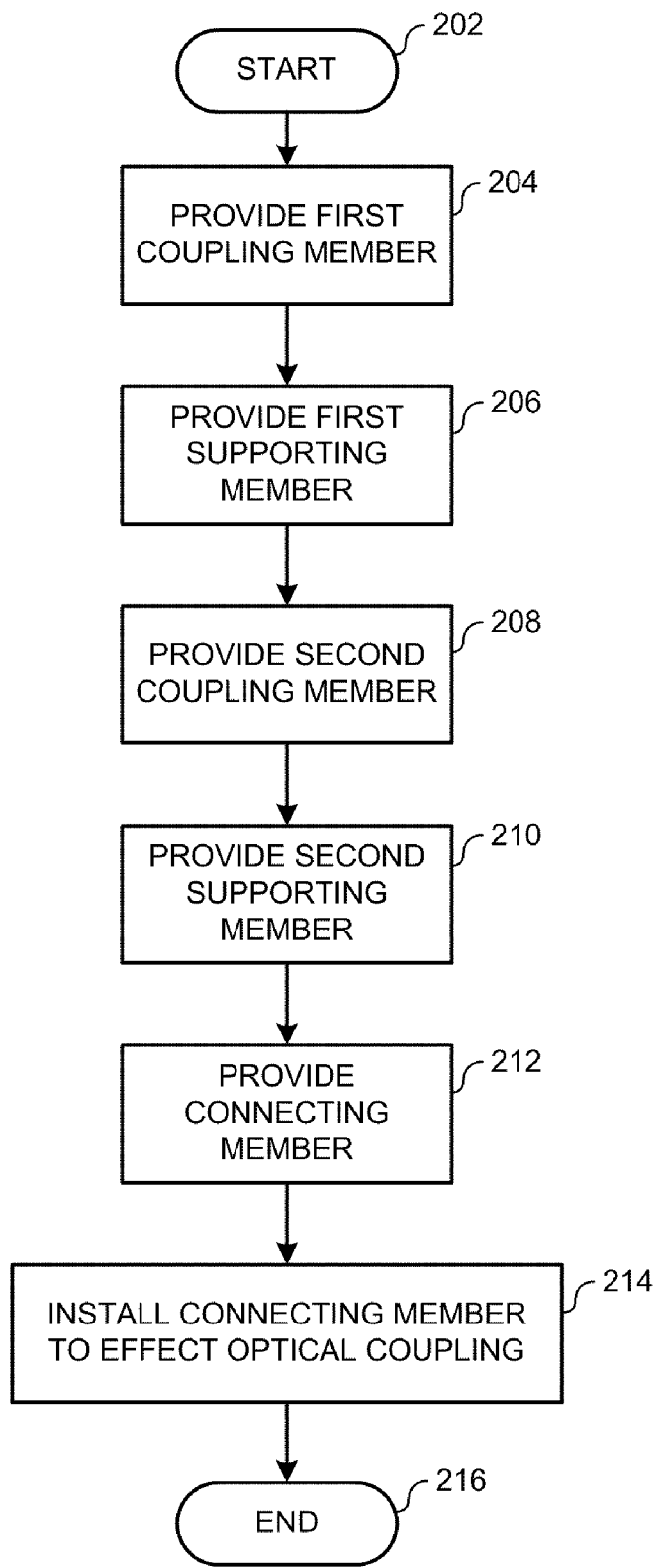
FIG. 6 is a flow chart illustrating the method of the disclosure.

FIG. 6 is a flow chart illustrating the method of the disclosure. In FIG. 6, a method 200 for establishing an optical circuit path spanning a discontinuity in at least one optical channel may begin at a START locus 202. The at least one optical channel may be supported by a first cable section generally oriented about a first axis on a first side of the discontinuity. The at least one optical channel may be supported by a second cable section generally oriented about a second axis on a second side of the discontinuity.

Method 200 may continue with providing a first coupling member coupled with the at least one optical channel on the first side of the discontinuity, as indicated by a block 204.

Method 200 may continue with providing a first supporting member substantially fixedly situated with the first coupling member, as indicated by a block 206. The first supporting member may be substantially fixedly situated in an installed orientation in a generally clamping relation with the first cable section.

Method 200 may continue with providing a second coupling member coupled with the at least one optical channel on the second side of the discontinuity, as indicated by a block 208.

Method 200 may continue with providing a second supporting member substantially fixedly situated with the second coupling member, as indicated by a block 210. The second supporting member may be substantially fixedly situated in an installed orientation in a generally clamping relation with the second cable section.

Method 200 may continue with providing a connecting member, as indicated by a block 212.

Method 200 may continue with installing the connecting member to effect optically coupling the first coupling member with the second coupling member to establish the optical circuit path, as indicated by a block 214.

Method 200 may terminate at an END locus 216.

It is to be understood that, while the detailed drawings and specific examples given describe embodiments of the disclosure, they are for the purpose of illustration only, that the apparatus and method of the disclosure are not limited to the precise details and conditions disclosed and that various changes may be made therein without departing from the spirit of the disclosure which is defined by the following claims:

We claim:

1. An apparatus for accommodating an optical circuit path spanning a discontinuity in at least one optical channel; said at least one optical channel being supported by a cable member generally oriented about a first axis; the apparatus comprising:
   (a) a coupling member coupled with said at least one optical channel; said coupling member and said at least one optical channel being located outside said cable member; and
   (b) a supporting member substantially fixedly situated with said coupling member; said supporting member and said cable member cooperating to effect substantially fixedly situating said supporting member in an installed orientation in a generally clamping relation with said cable member;
   said supporting member being configured in a split-ring structure; said split-ring structure presenting a generally cylindrical inner surface substantially oriented about a second axis substantially coaxial with said first axis in said installed orientation; said split-ring structure having a hinge member generally situated at a first locus of a plane intersecting said second axis on a first side of said second axis in said installed orientation; said split-ring structure having a latching structure generally situated at a second locus of said plane on a second side of said second axis in said installed orientation; said hinge member and said latching structure cooperating to effect said substantially fixedly situating said supporting member in said installed orientation.

2. The apparatus for accommodating an optical circuit path spanning a discontinuity in at least one optical channel as recited in claim 1 wherein said supporting member extends a length along said cable member in said installed orientation, wherein said supporting member includes a substantially low friction material layer generally abutting said cable member substantially along said length in said installed orientation, and wherein said supporting member includes a substantially compliant layer facing away from said cable member substantially along said length; said compliant layer deforming sufficiently to distribute pressure applied to said cable member generally across dimensions of said compliant layer in said installed orientation.

3. An apparatus for establishing an optical circuit path spanning a discontinuity in at least one optical channel; said at least one optical channel being supported by a first cable section externally of said first cable section; said first cable section being generally oriented about a first axis on a first side of said discontinuity; said at least one optical channel being supported by a second cable section externally of said second cable section; said second cable section being generally oriented about a second axis on a second side of said discontinuity; the apparatus comprising:
   (a) a first coupling member coupled with said at least one optical channel externally of said first cable section on said first side of said discontinuity;
   (b) a first supporting member substantially fixedly situated with said first coupling member; said first supporting member and said first cable section cooperating to effect substantially fixedly situating said first supporting member in an installed orientation in a generally clamping relation with said first cable section;
   (c) a second coupling member coupled with said at least one optical channel externally of said second cable section on said second side of said discontinuity;
   (d) a second supporting member substantially fixedly situated with said second coupling member; said second supporting member and said second cable section cooperating to effect substantially fixedly situating said second supporting member in an installed orientation in a generally clamping relation with said second cable section; and
   (e) a connecting member optically coupling said first coupling member with said second coupling member externally of said first cable section and said second cable section to establish said optical circuit path.

4. The apparatus for establishing an optical circuit path spanning a discontinuity in at least one optical channel as recited in claim 3 wherein each respective supporting member of said first supporting member and said second supporting member is configured in a respective split-ring structure; each said respective split-ring structure presenting a generally cylindrical inner surface substantially oriented about one axis of said first axis and said second axis in said installed orientation.

5. The apparatus for establishing an optical circuit path spanning a discontinuity in at least one optical channel as recited in claim 4 wherein said each said respective split-ring structure has a respective hinge member generally situated at a first locus of a plane intersecting one axis of said first axis and said second axis on a first side of one axis of said first axis and said second axis in said installed orientation, and wherein each said respective split-ring structure has a respective latching structure generally situated at a second locus of said plane on a second side of said one axis of said first axis and said second axis in said installed orientation; each said respective hinge member and each said respective latching structure of a respective said split-ring structure cooperating to effect said substantially fixedly situating each said respective supporting member in said installed orientation.

6. The apparatus for establishing an optical circuit path spanning discontinuity in at least one optical channel as recited in claim 5 wherein each respective supporting member of said first supporting member and said second supporting member extends a respective length along a respective cable section of said first cable section and said second cable section; wherein each said respective supporting member includes a substantially low friction material layer generally abutting a respective said cable section substantially along a respective said length in said installed orientation, and wherein each said respective supporting member includes a respective substantially compliant layer facing away from said respective cable section; said respective compliant layer deforming sufficiently to distribute pressure applied to said cable section generally across dimensions of said respective compliant layer in said installed orientation.

7. The apparatus for establishing an optical circuit path spanning a discontinuity in at least one optical channel as recited in claim 6 wherein said connecting member is a generally flexible length of optically transmitting material.

8. The apparatus for establishing an optical circuit path spanning a discontinuity in at least one optical channel as recited in claim 4 wherein each respective supporting member of said first supporting member and said second supporting member extends a respective length along a respective cable section of said first cable section and said second cable section; and wherein each said respective supporting member includes a substantially low friction material layer generally abutting a respective said cable section substantially along a respective said length in said installed orientation.

9. The apparatus for establishing an optical circuit path spanning a discontinuity in at least one optical channel as recited in claim 8 wherein said connecting member is a generally flexible length of optically transmitting material.

10. The apparatus for establishing an optical circuit path spanning a discontinuity in at least one optical channel as recited in claim 3 wherein each respective supporting member of said first supporting member and said second supporting member extends a respective length along a respective cable section of said first cable section and said second cable section; and wherein each said respective supporting member includes a substantially low friction material layer generally abutting a respective said cable section substantially along a respective said length in said installed orientation.

11. The apparatus for establishing an optical circuit path spanning a discontinuity in at least one optical channel as recited in claim 3 wherein said connecting member is a generally flexible length of optically transmitting material.

12. A method for establishing an optical circuit path spanning a discontinuity in at least one optical channel; said at least one optical channel being supported by a first cable section externally of said first cable section; said first cable section being generally oriented about a first axis on a first side of said discontinuity; said at least one optical channel being supported by a second cable section externally of said second cable section; said second cable section being generally oriented about a second axis on a second side of said discontinuity; the method comprising:
(a) providing a first coupling member coupled with said at least one optical channel externally of said first cable section on said first side of said discontinuity;
(b) providing a first supporting member substantially fixedly situated with said first coupling member; said first supporting member and said first cable section cooperating to effect substantially fixedly situating said first supporting member in an installed orientation in a generally clamping relation with said first cable section;
(c) providing a second coupling member coupled with said at least one optical channel externally of said second cable section on said second side of said discontinuity;
(d) providing a second supporting member substantially fixedly situated with said second coupling member; said second supporting member and said second cable section cooperating to effect substantially fixedly situating said second supporting member in an installed orientation in a generally clamping relation with said second cable section;
(e) providing a connecting member; and
(f) installing said connecting member to effect optically coupling said first coupling member with said second coupling member externally of said first cable section and said second cable section to establish said optical circuit path.

13. The method for establishing an optical circuit path spanning a discontinuity in at least one optical channel as recited in claim 12 wherein each respective supporting member of said first supporting member and said second supporting member is configured in a respective split-ring structure; each said respective split-ring structure presenting a generally cylindrical inner surface substantially oriented about one axis of said first axis and said second axis in said installed orientation.

14. The method for establishing an optical circuit path spanning a discontinuity in at least one optical channel as recited in claim 13 wherein said each said respective split-ring structure has a respective hinge member generally situated at a first locus of a plane intersecting one axis of said first axis and said second axis on a first side of one axis of said first axis and said second axis in said installed orientation, and wherein each said respective split-ring structure has a respective latching structure generally situated at a second locus of said plane on a second side of said one axis of said first axis and said second axis in said installed orientation; each said respective hinge member and each said respective latching structure of a respective said split-ring structure cooperating to effect said substantially fixedly situating each said respective supporting member in said installed orientation.

15. The method for establishing an optical circuit path spanning a discontinuity in at least one optical channel as recited in claim 14 wherein each respective supporting member of said first supporting member and said second supporting member extends a respective length along a respective cable section of said first cable section and said second cable section; and wherein each said respective supporting member includes a substantially low friction material layer generally abutting a respective said cable section substantially along a respective said length in said installed orientation.

16. The method for establishing an optical circuit path spanning a discontinuity in at least one optical channel as recited in claim 15 wherein said connecting member is a generally flexible length of optically transmitting material.

\* \* \* \* \*